(No Model.)
W. E. BROCK.
HAMMOCK SPREADER.
No. 317,291. Patented May 5, 1885.
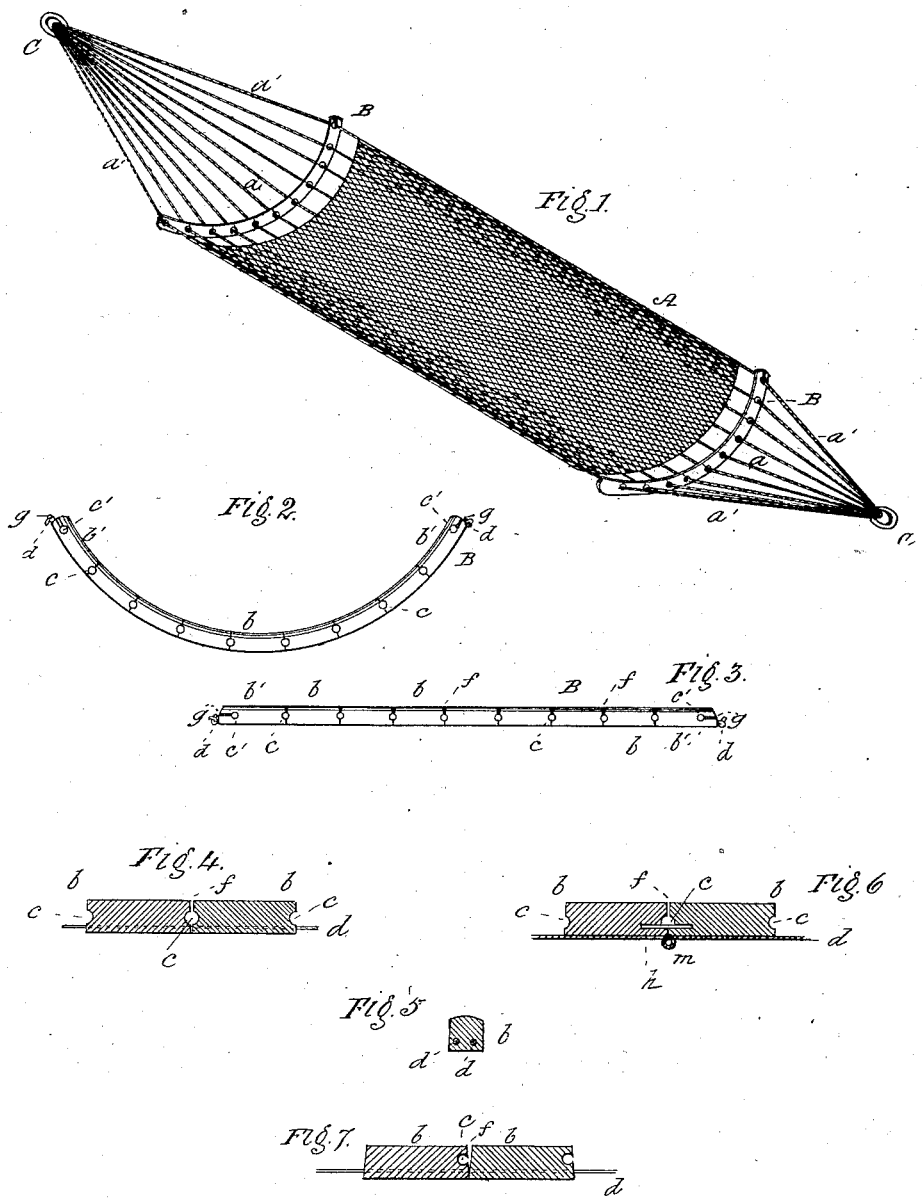

UNITED STATES PATENT OFFICE.

WILLIAM E. BROCK, OF DUNELLEN, NEW JERSEY, ASSIGNOR TO HAMILTON T. DISBROW, OF BROOKLYN, AND HERMAN G. DISBROW, OF NEW YORK, N. Y.

HAMMOCK-SPREADER.

SPECIFICATION forming part of Letters Patent No. 317,291, dated May 5, 1885.

Application filed July 22, 1884. (No model.)

*To all whom it may concern:*

Be it known that I, WILLIAM E. BROCK, of Dunellen, in the county of Middlesex and State of New Jersey, have invented a new and useful Improvement in Hammock-Spreaders; and I hereby declare the following to be a full, clear, and exact description thereof, reference being had to the accompanying drawings, which form a part of this specification.

This invention relates to an improvement in the construction of bars or spreaders for distending a hammock while suspended; and the object of said invention is to construct a spreader in such manner that it can be very easily and readily applied, will retain the suspension-cords firmly in position while the hammock is suspended, and, being made flexible, will assume the proper curve while in use, but can be straightened for convenience in packing. Its flexibility also adds to the comfort of the occupant, as the hammock is thereby made to yield and adapt itself to any change of position of said occupant.

The invention consists, mainly, in a hammock spreader or bar composed of a series of separate lengths connected and supported by a wire or flexible band passing lengthwise through the same or attached to the under side thereof, each end of each of said lengths being cut to slant slightly inward and upward, so as to admit of the bar being curved, and each of said ends being slotted to receive the suspension-cords of the hammock; and it further consists in certain novel constructions and combinations, all of which are hereinafter particularly set forth and described.

In the accompanying drawings, Figure 1 represents a perspective view of a hammock with my improved hammock-spreader applied thereto. Fig. 2 is a side view of the spreader detached from the hammock; Fig. 3, a side view of the same as it appears when straightened for packing; and Figs. 4 and 5 are details hereinafter explained. Fig. 6 represents a modification hereinafter described.

Similar letters of reference indicate the same parts in all the several figures, and Figs. 2 and 3 are drawn to a scale twice the size of Fig. 1, and Figs. 4, 5, and 6 are on a scale twice the size of Figs. 2 and 3.

A represents an ordinary hammock, $a\ a'$ being the suspension-cords attached to rings C C, by which the respective ends are attached to some suitable support (not shown) in the usual manner.

B is my improved spreader or bar, by means of which the hammock is distended laterally. This bar or spreader is composed of a series of lengths, $b$, of wood or other suitable material, having slots or perforations $c\ c'$ formed in their ends, one half of the slot or perforation being formed in the end of the one length, and the other half formed in the end of the adjoining length, as shown. One or more wires or bands, $d$, of any suitable material, is or are passed through longitudinal slots in the several lengths $b$ to connect the same and support them under pressure, said wires being secured to the end blocks or lengths, $b'$, and the ends of each length are cut to slightly slant inwardly and upwardly, as seen at $f$, so as to admit of the bar being curved, as shown in Figs. 1 and 2. By means of this construction the cords $a$ can readily be inserted into the slots $c$ by passing them through the upper ends of the several openings between the lengths $b$, and when the bar has been brought into the curved position said cords are effectually prevented from moving sidewise.

$g\ g$ are small longitudinal slots extending from the outer ends of the bar to the end perforations, $c'$, through which said slots $g$ the outer suspension-cords, $a'$, are passed into their respective perforations. The ends of the bar are thus pressed toward each other, thereby causing said bar to assume and retain the curved position, and keeping the suspension-cords at suitable distances apart while the hammock is in use, and at the same time admitting of the bars being straightened out, as shown in Fig. 3, for convenience in packing.

In the modification shown in Fig. 6 the wire or band $d$ is attached to the under side of the lengths by tacks or staples, instead of passing through the same; but this I deem to be an equivalent mode, as it effects the same result in substantially the same manner—namely, to connect and support the several lengths. When this latter construction is adopted, the band may be re-enforced by means of short lengths of wire $h$, let into the wood immediately below the perforations between the several lengths, which will partially remove the strain from the band $d$; and, if desired, one or more pivot-joints may be formed on said band, as shown at $m$ in Fig. 6, to permit the bar being folded into short lengths for packing. The wires $h$ may also be used when the band passes through the several lengths, if preferred.

I may state, in conclusion, that it is not essential that the perforations $c$ be divided between the lengths, as above described, as each may be formed wholly in one length $b$, and connected with the opening $f$ between such length and the adjoining length, as shown in Fig. 7.

I am aware that a hammock-spreader consisting of a rigid curved bar having slots cut on its under edge has heretofore been used, and I do not claim such construction, but hereby disclaim the same.

What I claim as my invention is—

1. A hammock-spreader composed of a series of lengths, $b$, having slanting or radial ends and slots or perforations $c$ formed therein, said lengths being connected and supported by a wire or band, $d$, as shown and described, for the purpose set forth.

2. A hammock-spreader composed of a series of lengths, $b$ and $b'$, having perforations $c$ and $c'$ and slanting or radial ends connected and supported by a band, $d$, and said lengths $b'$ $b'$ provided with slots $g$ $g$, as and for the purpose set forth.

3. A hammock-spreader composed of a series of lengths, $b$, having perforations $c$ and slanting or radial ends, and provided with the pins $h$, let into the ends of adjoining lengths, as shown and described.

WILLIAM E. BROCK.

Witnesses:
JOHN S. THORNTON,
NELSON ZABRISKIE.